May 20, 1924.

G. J. RACKHAM 1,494,502

CONTROLLED DIFFERENTIAL GEARING

Filed Aug. 1 1922 2 Sheets-Sheet 1

Inventor
George John Rackham
by his Attorneys
Baldwin Wight

May 20, 1924.
G. J. RACKHAM
1,494,502
CONTROLLED DIFFERENTIAL GEARING
Filed Aug. 1 1922      2 Sheets-Sheet 2
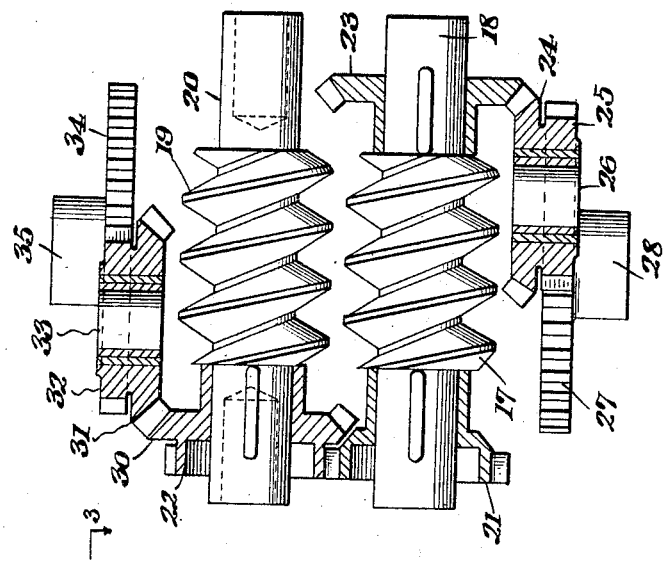
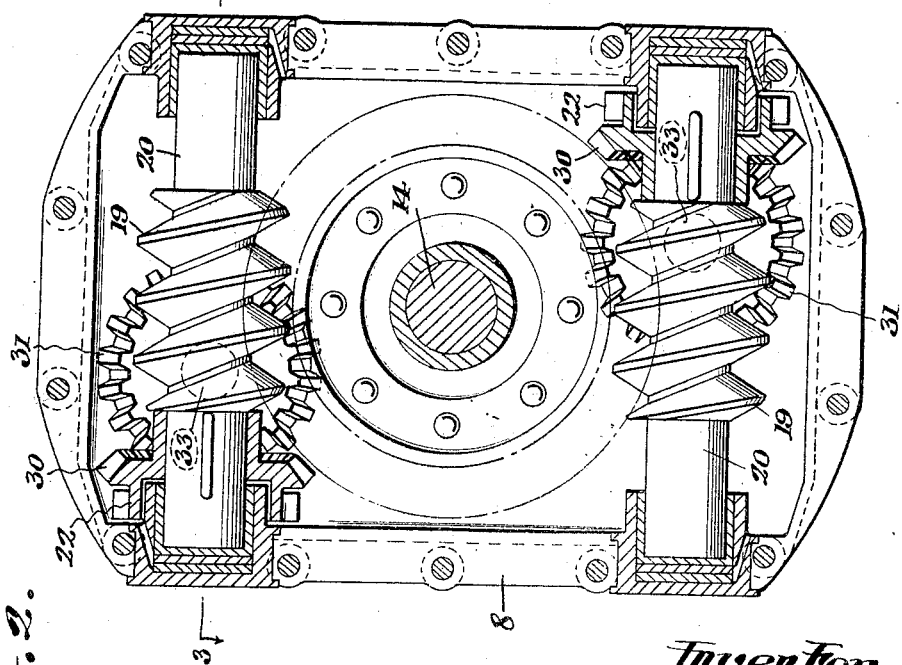

Patented May 20, 1924.

1,494,502

UNITED STATES PATENT OFFICE.

GEORGE JOHN RACKHAM, OF PUTNEY, LONDON, ENGLAND, ASSIGNOR TO ROADLESS PATENTS HOLDING COMPANY, OF WASHINGTON, DISTRICT OF COLUMBIA, A CORPORATION OF DELAWARE.

CONTROLLED DIFFERENTIAL GEARING.

Application filed August 1, 1922. Serial No. 579,043.

*To all whom it may concern:*

Be it known that I, GEORGE JOHN RACKHAM, a subject of the King of Great Britain, and a resident of 146 Upper Richmond Road, Putney, London, England, have invented certain new and useful Improvements in Controlled Differential Gearing, of which the following is a specification.

Whenever a wheeled vehicle having each pair of wheels on a common axle turns, the outer wheels must traverse a greater distance than the inner wheels, and this causes the inner wheels to slip on the surface, producing unnecessary wear and other objectionable results.

This is particularly noticeable in the case of caterpillar track machines in which the track is of considerable breadth and has an extended portion in contact with the surface over which it is passing.

This invention is particularly adapted for caterpillar track machines, and especially those of the type in which there are laterally flexible tracks. In machines provided with such tracks the steering usually is effected by laying the tracks down in a curve or radius on the ground so as to avoid the skidding that would occur with a laterally rigid track.

In order to avoid this skidding, the inner and outer tracks should be laid down on arcs of concentric circles, the radius of the circle of the outer track differing from that of the inner track by the distance between the centers of the tracks. Since the outer track has a larger turning circle it should travel at a slightly greater speed when steering.

This invention provides means whereby such variation in speed of the two tracks can be readily attained, and it secures the desired result by slightly increasing the speed of the outer track and simultaneously and proportionally decreasing the speed of the inner track.

An object of the invention is to provide differential gearings that will produce the desired result as set forth above in an efficient manner and by the use of relatively simple structure.

Other objects will be apparent from the following detailed description and the appended claims.

In the drawings:

Figure 2 is a cross section on the line 2—2 of Figure 1.

Figure 3 is a section on the line 3—3 of Figure 1.

Figure 1:
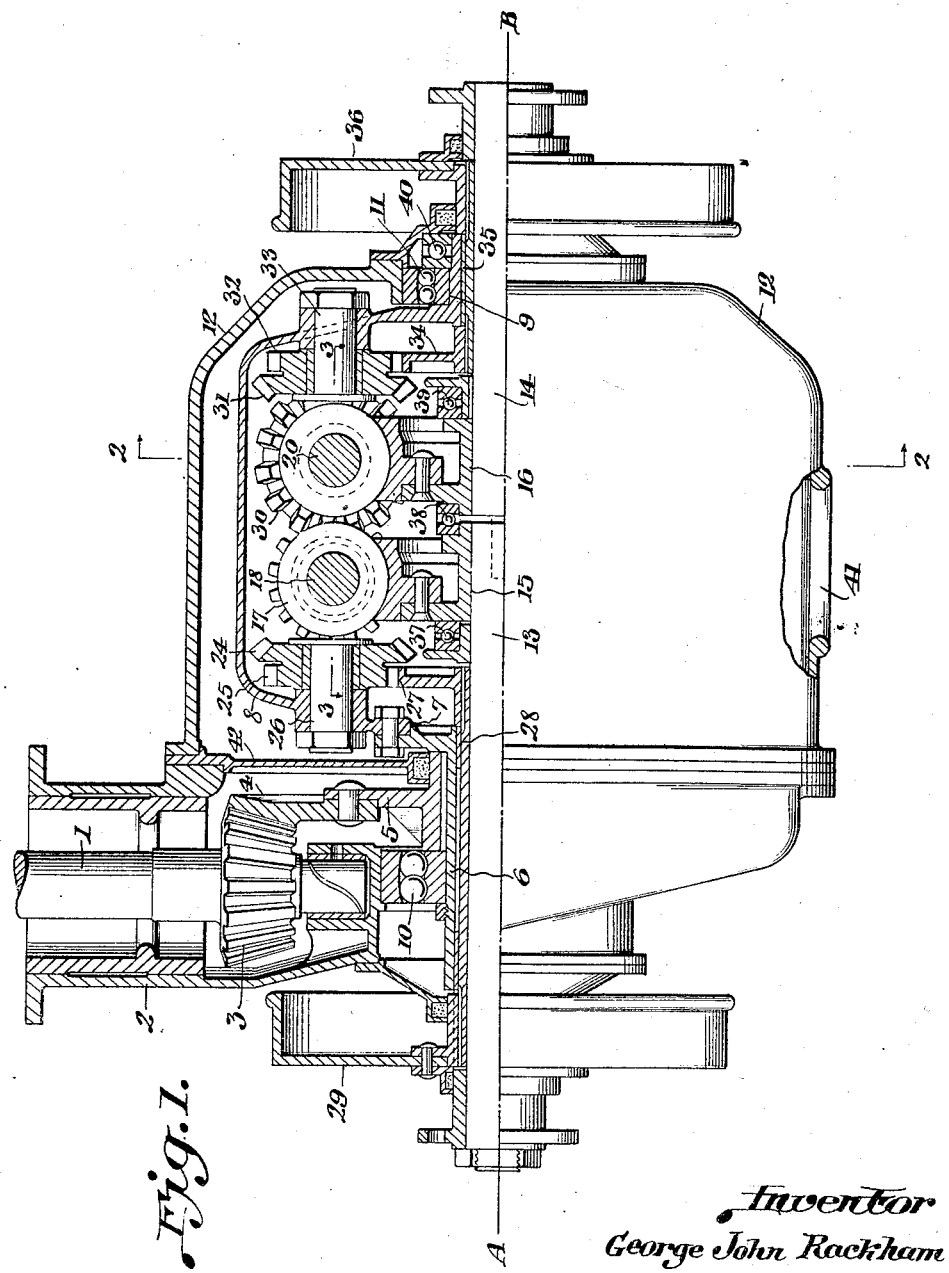
Figure 1 is a view of the device constituting my invention, the upper half being a section and the lower half an elevation.

The main driving shaft 1 is connected to the engine and mounted in bearing in any usual or suitable manner in the fixed casing 2 and is provided near its end with a bevel pinion 3. This pinion meshes with a bevel pinion 4 which is fast with a flange 5 that is keyed or splined to a hollow shaft 6 having a flange secured at 7 to a casing 8 which has an extended hollow shaft bearing 9. Ball bearings 10 are interposed between the hollow shaft 6 and the fixed casing 2, and similar ball bearings 11 are interposed between the portion 9 and the fixed casing 12 which is bolted or otherwise fastened to the casing 2.

It is to be understood that the casing 8 and mechanism shown therein is only shown in half in Figure 1, the parts shown being duplicated below the line A—B.

Shafts 13 and 14 are connected to the two tracks. A worm wheel 15 is fixed to the shaft 13 and a similar worm wheel 16 is fixed to the shaft 14. Two worms 17 on shafts 18 mesh with the worm wheel 15, and similarly two worms 19 on shafts 20 mesh with the worm wheel 16. As stated, only one of each pair of worms is shown in Figure 1, but both worms 19 are shown in Figure 2.

A pinion 21 fast on the worm shaft 18 meshes with a pinion 22 fast on the worm shaft 20, so that the worms will turn in unison. The worm shaft 18 also has splined or otherwise fastened thereto a bevel gear 23 which meshes with a bevel gear 24 rigid or unitary with a pinion 25, the gear and pinion turning on a short pin or shaft 26 mounted in the casing 8. The pinion 25 meshes with a pinion 27 on a hollow shaft 28 lying between the hollow shaft 6 and the shaft 13. At its outer end the shaft 28 carries or is connected to a brake drum 29. Similarly, the worm shaft 20 has fastened thereon a bevel gear 30, conveniently made in one part with the pinion 22, which bevel gear meshes with a bevel gear 31 rigid with a pinion 32, the gear and pinion turning on a pin or short shaft 33 mounted in the casing 8. The pinion 32 meshes with a pinion 34 on a hollow shaft 35 lying between the extension 9 and the shaft 14. At its outer end the shaft 35 carries or is connected to a brake drum 36. Ball bearings 37, 38, 39 and 40 are disposed at places where relative movement may take place to facilitate such movement, and to take up side thrust between the parts.

The casing 8 which incloses the differential mechanism, may be made in one or more parts, but it is oil tight and is partly filled with oil for lubrication. The casing 12 carries no lubricant and has vent holes 41. A plate 42 divides the casing 12 from the casing 2, the latter being partly filled with oil for lubrication of the bevels 3 and 4.

The operation of the device is as follows:

When the machine is proceeding straight ahead, the bevel gear 3 together with the differential casing 8 with the worms and gears contained therein, and the brake drums 29 and 36 all rotate as one piece, transmitting equal revolutions to both tracks through the shafts 13 and 14. If it is desired to steer the machine to the left, the brake is applied to the brake drum 29 so as to reduce its speed. This retards the spur gear 27 and causes the pinion 25 and bevel gear 24 to rotate on the pin 26, in addition to the rotation of the whole differential mechanism around its axis.

Since the bevel 24 meshes with the bevel 23 on the shaft 18, this causes the worm 17 to rotate about its own axis. This will retard the rotation of the worm wheel 15 and consequently slacken the speed of the shaft 13 and the track to which it is connected, which is the inner track. Also, since the worm 17 is connected to the worm 19 through the gears 21 and 22, the worm 19 will be caused to rotate on its own axis but in a direction opposite to that of the worm 17. This will accelerate the rotation of the worm wheel 16 and consequently increase the speed of the shaft 14 and the track to which it is connected, which is the outer track. It is evident that the rotation of one track will be increased in exactly the same degree that the rotation of the other track is decreased. Both worms are threaded in the same direction and the shafts have their gears 23 and 30 at opposite ends, thus bringing about the action described.

If it is desired to turn to the right, the brake is applied to the right hand drum 36 and a corresponding action takes place. If either brake is applied with force enough to stop the rotation of the brake drum, a minimum turning circle is obtained. The gearing in the controlled differential should be so arranged that this minimum turning would cause the maximum amount of flexing of the track links which the design of the track permits. Larger turning circles are obtained by allowing the brake drum to slip a certain amount.

An alternative arrangement would be to omit one brake drum and its connected gearing, and control the other brake drum by a suitable variable speed gear, driven from the transmission gear at the rear of the change speed box. With such an arrangement the steering to right or left would be obtained by controlling the speed of the brake drum by means of the variable speed gear from double the normal revolutions when steering to the right to no revolutions when steering to the left.

Various details of the structure may be modified and changes in form, arrangement and size of parts may be made without departing from the spirit of the invention. While especially adapted for endless track vehicles of the type specified it is in no way limited thereto, but is capable of valuable use in other types of vehicles. In general it may be stated that the invention is to be regarded as limited only by the scope of the appended claims and by the statements of novelty set forth in the foregoing specification.

I claim as my invention:

1. A differential steering gear comprising two axle shafts mounted in line, a worm wheel on each shaft, worm shafts, worms thereon meshing with said worm wheels, gearing connecting said worm shafts to turn them in opposite directions, brake drums mounted on hollow shafts surrounding the axle shafts, and connections from said worm shafts to said hollow shafts.

2. A differential steering gear comprising two axle shafts mounted in line, a worm wheel on each shaft, worm shafts extending transversely of the axle shafts, worms thereon meshing with the worm wheels, gearing connecting the worm shafts to turn them in opposite directions, brake drums mounted on hollow shafts surrounding the axle shafts, and gearing connecting the worm shafts with the hollow shafts.

3. A differential gear comprising two driven parts, a worm wheel on each part, a casing rotating about the axis of the driven parts, shafts mounted in the casing, worms thereon meshing with the worm wheels, brake drums, gearing connecting the brake drums with the worms, the rotation of the casing alone communicating equal speeds to the driven parts, and the retardation of either brake drum causing the worms to rotate on their own axes and communicate different speeds to the driven parts.

4. A differential gear comprising two driven parts, a worm wheel on each part, a casing rotating about the axis of the driven parts, shafts mounted in the casing, worms thereon meshing with the worm wheels, means causing the worm wheels to rotate together but in opposite directions, brake drums, gearing connecting the brake drums with the worms, the rotation of the casing alone communicating equal speeds to the driven parts, and the retardation of either brake drum causing the worms to rotate on their own axes and increase the speed of one driven part while similarly decreasing the speed of the other.

In testimony whereof, I have hereunto subscribed my name.

GEORGE JOHN RACKHAM.